(12) United States Patent
Schmid et al.

(10) Patent No.: US 7,662,043 B2
(45) Date of Patent: Feb. 16, 2010

(54) TORSIONAL VIBRATION DAMPER FOR A HYDRODYNAMIC CLUTCH ARRANGEMENT

(75) Inventors: Herbert Schmid, Münnerstadt (DE); Herbert Johann, Würzburg (DE); Georg Ender, Obereisenheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 303 days.

(21) Appl. No.: 11/595,227

(22) Filed: Nov. 10, 2006

(65) Prior Publication Data
US 2007/0108006 A1    May 17, 2007

(30) Foreign Application Priority Data
Nov. 11, 2005    (DE)    .................. 10 2005 053 822

(51) Int. Cl.
*F16D 3/77*    (2006.01)
(52) U.S. Cl. ........................... 464/99; 464/68.1
(58) Field of Classification Search ............... 464/68.1, 464/68.4, 68.41, 81–86, 98, 99; 192/3.21, 192/3.29; 60/338
See application file for complete search history.

(56) References Cited
U.S. PATENT DOCUMENTS
4,353,444 A * 10/1982 Bionaz .................. 192/3.29
4,871,342 A * 10/1989 Boss et al. ..................... 464/98
6,298,965 B1   10/2001 Krause et al.
6,478,127 B2   11/2002 Fukushima

FOREIGN PATENT DOCUMENTS
DE   10 2004 045 366   4/2006

* cited by examiner

*Primary Examiner*—Greg Binda
(74) *Attorney, Agent, or Firm*—Cohen Pontani Lieberman & Pavane LLP

(57) ABSTRACT

The torsional vibration damper acting between a drive and a housing of a hydrodynamic clutch arrangement includes a flywheel mass element, a drive-side damping element having a first side connected nonrotatably to the flywheel mass element, a takeoff-side damping element, the second side of the drive-side damping element being connected by elastic elements to the takeoff-side damping element for rotation in common, the elastic elements also allowing a small rotation of the drive-side damping element relative to the takeoff-side damping element, and an axially flexible drive plate. The takeoff-side damping element can be connected to the housing of the hydrodynamic clutch arrangement nonrotatably but with a certain freedom of axial movement by means of the drive plate.

12 Claims, 3 Drawing Sheets

TORSIONAL VIBRATION DAMPER FOR A HYDRODYNAMIC CLUTCH ARRANGEMENT

BACKGROUND OF THE INVENTION

The invention pertains to a torsional vibration damper for a hydrodynamic clutch arrangement.

A torsional vibration damper is, for example, known from U.S. Pat. No. 6,478,127. The torsional vibration damper is installed axially between a flywheel mass element, which is attached to a drive such as the crankshaft of an internal combustion engine, and a housing of the hydrodynamic clutch arrangement, which is realized as a torque converter. The torsional vibration damper is provided with a drive-side damping element, which is connected nonrotatably on one side to the flywheel mass element and connected for rotation in common on the other side by means of elastic elements to the takeoff-side damping element of the torsional vibration damper, the takeoff-side damping element being in functional connection by way of the hydrodynamic clutch arrangement with a takeoff formed by a gearbox input shaft.

In the known torsional vibration damper, the drive-side damping element is fastened jointly with the flywheel mass element to the drive by means of fastening elements, namely, from the side of the hydrodynamic clutch arrangement. Because the fastening elements are no longer accessible after the hydrodynamic clutch arrangement has been installed, it is necessary to provide a way to detach the drive-side damping element from the elastic elements remaining attached to the hydrodynamic clutch arrangement and from the takeoff-side damping element. Providing this separability, however, causes wear-related problems with the axial positioning of the hydrodynamic clutch arrangement, because the free end of the drive-side damping element facing away from the drive and possibly the free end of a bearing journal provided in the radially inside area of the housing of the hydrodynamic clutch arrangement act as axial support for the hydrodynamic clutch arrangement, and both axial supports are provided in positions of relative rotational movement of the components which enter into axial contact with each other. In addition, connecting the torsional vibration damper to the hydrodynamic clutch arrangement in this way permits no axial elasticity of the latter with respect to the drive, so that the axial vibrations which are generated by the drive and which induce wobbling movements in the flywheel mass element with respect to the axis of rotation of the hydrodynamic clutch arrangement are transmitted with little if any damping to the housing of the hydrodynamic clutch arrangement, where, as a result of the fluid filling of the latter, they are considered especially critical.

It is known from U.S. Pat. No. 6,298,965 that a drive can be connected by way of a drive plate which is flexible in the axial direction to a drive-side damping element of a torsional vibration damper and from this via elastic elements and a takeoff-side damping element to the housing of a hydrodynamic clutch arrangement. As a result of the flexible drive plate, referred to in brief below as a flexplate, axial vibrations of the drive can be effectively kept away from the housing of the hydrodynamic clutch arrangement. Because of its location effectively between the drive and the torsional vibration damper, however, this flexplate prevents the realization of a direct connection between the hydrodynamic clutch arrangement and the drive in the event that the torsional vibration damper is omitted. Thus, this solution is not very versatile with respect to applications in the automobile industry, where it is known that frequently changing requirements call for constant adaptation to specific demands.

SUMMARY OF THE INVENTION

It is an object of the present invention to connect a torsional vibration damper to a hydrodynamic clutch arrangement in such a way that the housing of the hydrodynamic clutch arrangement can be easily installed on a drive and that the degree to which the wobbling movements generated by the drive are transmitted to the housing can be at least reduced, regardless of whether the torsional vibration damper is present or not.

According to a preferred embodiment of the invention, the torsional vibration damper acting between a drive and a housing of a hydrodynamic clutch arrangement includes a flywheel mass element, a drive-side damping element having a first side connected nonrotatably to the flywheel mass element, a takeoff-side damping element, the second side of the drive-side damping element being connected by elastic elements to the takeoff-side damping element for rotation in common, the elastic elements also allowing a small rotation of the drive-side damping element relative to the takeoff-side damping element, and an axially flexible drive plate. The takeoff-side damping element can be connected to the housing of the hydrodynamic clutch arrangement nonrotatably but with a certain freedom of axial movement by means of the drive plate.

By making use of the takeoff-side damping element of the torsional vibration damper as a means of establishing a nonrotatable connection to an axially flexible drive plate, referred to in brief below as the flexplate, the above mentioned object is achieved in that the latter is located on the takeoff-side of the torsional vibration damper. Because the flexplate for its own part is connected nonrotatably to the housing of the hydrodynamic clutch arrangement such as a torque converter or hydraulic clutch, the hydrodynamic clutch arrangement is connected nonrotatably to the torsional vibration damper by means of the flexplate but still has some freedom of movement in the axial direction. As a result, the transmission of torque between a drive, such as the crankshaft of an internal combustion engine, and the housing of the hydrodynamic clutch arrangement is not hindered by the flexplate, but the degree to which the wobbling movements of the drive, which have at least one component acting in the axial direction, are transmitted to said housing is at least reduced.

Because the connection between the takeoff-side damping element and the flexplate, especially here to the drive side of the flexplate, is designed to be detachable, it is also possible, in the absence of a requirement for a torsional vibration damper, to fasten the flexplate directly to the drive at exactly those points where it would normally be fastened to the takeoff-side damping element. There is no need for any modifications to the components. In this case, the housing of the hydrodynamic clutch arrangement, along with the flexplate attached to it, would simply be brought closer to the drive by the distance which would otherwise be taken up in the axial direction by the torsional vibration damper, so that the flexplate can then be fastened detachably to the drive in this new position.

The takeoff-side damping element preferably has not only at least one cover plate, which serves to actuate the elastic elements of the torsional vibration damper, but also a takeoff hub, connected nonrotatably to this cover plate, which hub forms an axially and radially secured receptacle for the drive side of the flexplate, which is especially advantageous if the takeoff hub is axially and/or radially supported against the drive. In an advantageous embodiment, the takeoff hub is therefore supported by way of a support ring either directly on the drive or by way of a component permanently attached to the drive such as the flywheel mass element. This support of the takeoff hub by means of the support ring is advantageously accomplished by way of a bearing arrangement, where, in the ideal case, both radial support and axial support are provided. As a result, wear between the drive or the flywheel mass element, which defines the movements of the drive-side damping element of the torsional vibration damper, and the support ring, which copies the movements of the takeoff-side damping element of the torsional vibration damper, is minimized. In an especially simple embodiment of the bearing arrangement, all the bearings can be designed as journal bearings. In an especially low-friction embodiment, all the bearings are realized in the form of roller bearings, where combinations of journal bearings and roller bearings are also conceivable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below on the basis of exemplary embodiments.

DETAILED DESCRIPTION OF THE PRESENTLY PREFERRED EMBODIMENTS

Figure 1:
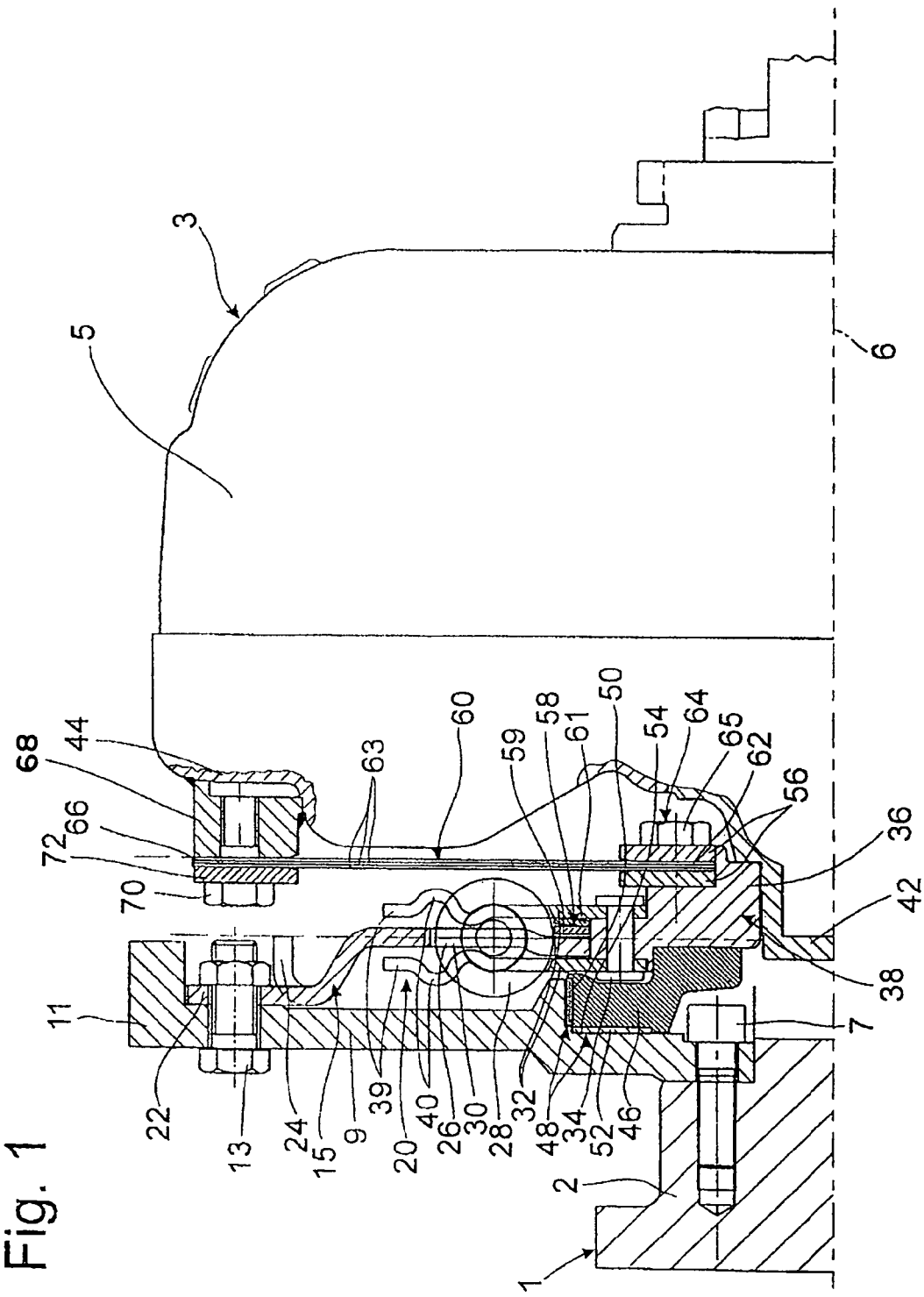
FIG. 1 is a cross sectional view of a first embodiment of a clutch system including a drive for a hydrodynamic clutch arrangement, a torsional vibration damper, and the hydrodynamic clutch arrangement.

FIG. 1 shows a drive 1 in the form of a crankshaft 2 of an internal combustion engine (not shown) for a hydrodynamic clutch arrangement 3, realized as a torque converter or hydraulic clutch, for example, wherein the clutch arrangement 3 has a housing 5. The clutch arrangement 3 has essentially the same axis of rotation 6 as the drive 1.

A flywheel mass element 9 is attached to the crankshaft 2 by means of fastening elements 7. This flywheel mass element 9 extends outward essentially in the radial direction until its outer circumference merges with an axial extension 11 pointing toward the hydrodynamic clutch arrangement 3. Directly inside the axial extension 11 in the radial direction, a hub flange-shaped, drive-side damping element 15 of a torsional vibration damper 20 is attached to the flywheel mass element 9 by fastening elements 13. The fastening elements 13 are held in holding sections 22 of the damping element 15. These holding sections 22 are provided at predetermined circumferential distances from each other and extend outward in the radial direction beyond bent-over sections 24, which are located circumferentially between the holding sections 22 and which are bent over the axial direction to provide a stiffening function.

The drive-side damping element 15 has windows 26 to hold elastic elements 28, where these windows 26 are provided at their circumferential ends with drive elements 30 for actuating the elastic elements 28. The elastic elements 28 are supported at their other end against drive elements 39 of the cover plates 32. These drive elements 39 form the circumferential boundaries of openings 40. The cover plates 32 are fastened to a takeoff-side hub 36 by rivets 34 so that, together with it, they form the takeoff-side damping element 38 of the torsional vibration damper 20. One of the cover plates 32 holds a friction device 58 axially between itself and the drive-side damping element 15, the friction device being provided with an axial spring 61 braced against the cover plate 32 and with a friction disk 59, which is in working contact with the axial spring 61 and rests against the drive-side damping element 15.

The takeoff hub 36 of the torsional vibration damper 20 is centered on a bearing journal 42 of a housing cover 44 of the housing 5 but has freedom of both rotational and axial movement on the journal 42. On the drive side, the takeoff hub 36 is supported against the flywheel mass element 9 by a support ring 46 and a bearing arrangement 48 formed by a radial journal bearing element 50 and by an axial journal bearing element 52. The support ring 46 is centered on the flywheel mass element 9 by the radial journal bearing element 50 and the support ring 46 is held axially on the flywheel mass element 9 by the axial journal bearing element 52. The flywheel mass element 9 is provided with a recess 54 to accommodate the bearing arrangement 48 and the support ring 46. The torsional vibration damper 20 and especially its takeoff-side damping element 38 are thus positioned by the bearing arrangement 48 and the support ring 46 both axially and radially with respect to the flywheel mass element 9 and with respect to the drive 1.

On the takeoff-side, the takeoff hub 36 of the torsional vibration damper 20 holds the radially inner end of an axially flexible drive plate 60, referred to in brief in the following as the flexplate 60, between two radially inner stiffening rings 56. The radially inner end of flexplate 60 serves as the drive side 62. The flexplate 60 can be formed by a stack of spring rings 63. The drive side 62 of the flexplate 60 and the radially inner stiffening rings 56 are attached jointly to the takeoff hub 36 by fastening elements 65, which act as a detachable connection 64. In addition, the radially outer end of the flexplate 60, which acts as the takeoff side 66, is fastened to receptacles 68 in the housing 5 by fastening elements 70, which grip the flexplate 60 by way of radially outer stiffening rings 72.

Figure 2:
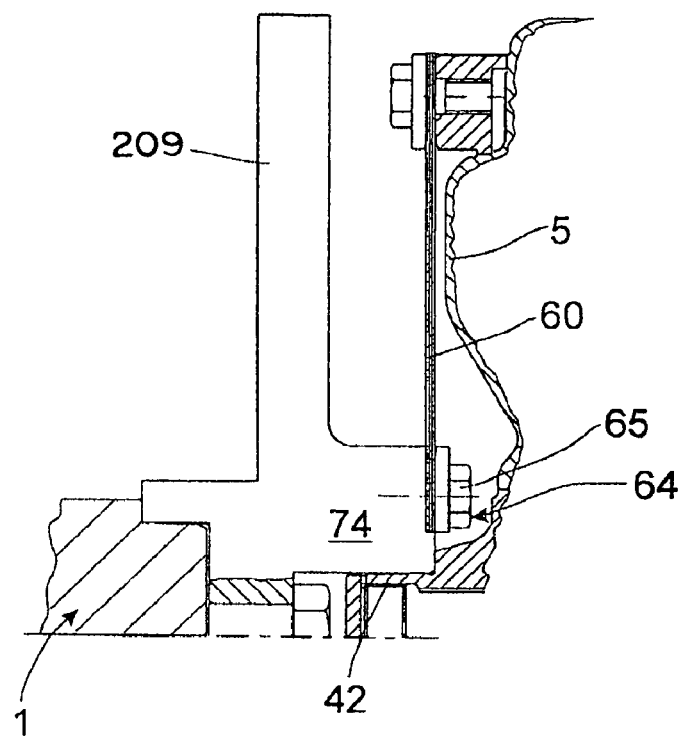
FIG. 2 is a schematic cross sectional view of the clutch system of FIG. 1, with the torsional vibration damper omitted.

Because the flexplate 60 is located axially between the torsional vibration damper 20 and the housing 5, the clutch arrangement 3 can be attached to the drive 1 by way of the torsional vibration damper 20, as shown in FIG. 1 discussed above. If a torsional vibration damper 20 of this type is not necessary for reasons of vibration engineering, however, or if it cannot be integrated because of the lack of axial space, it is possible as an alternative, as shown in FIG. 2, to omit the torsional vibration damper 20 and to attach the clutch arrangement 3 directly to the flywheel mass element 209. In the latter case, the fastening elements 65 of the detachable connection 64 engage directly in a flywheel mass element hub 74, which centers the housing 5 by way of the bearing journal 42.

Figure 3:
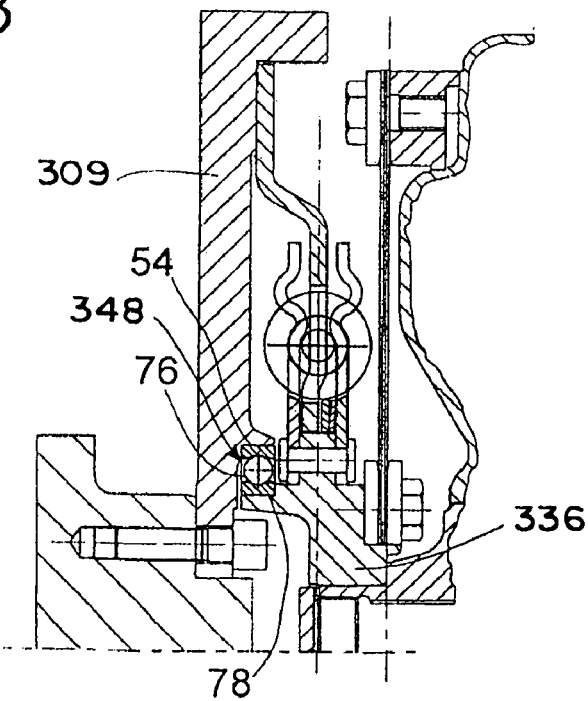
FIG. 3 is a cross sectional view of another embodiment of the clutch system.

FIG. 3 shows the bearing arrangement 348 as realized by a roller bearing 76, which acts both in the axial direction and in the radial direction, and which, on the drive side, again engages in the recess 54 in the flywheel mass element 309, whereas on the takeoff side, in contrast to the embodiment according to FIG. 1, it is inserted directly into a recess 78 in the takeoff hub 336.

Figure 4:
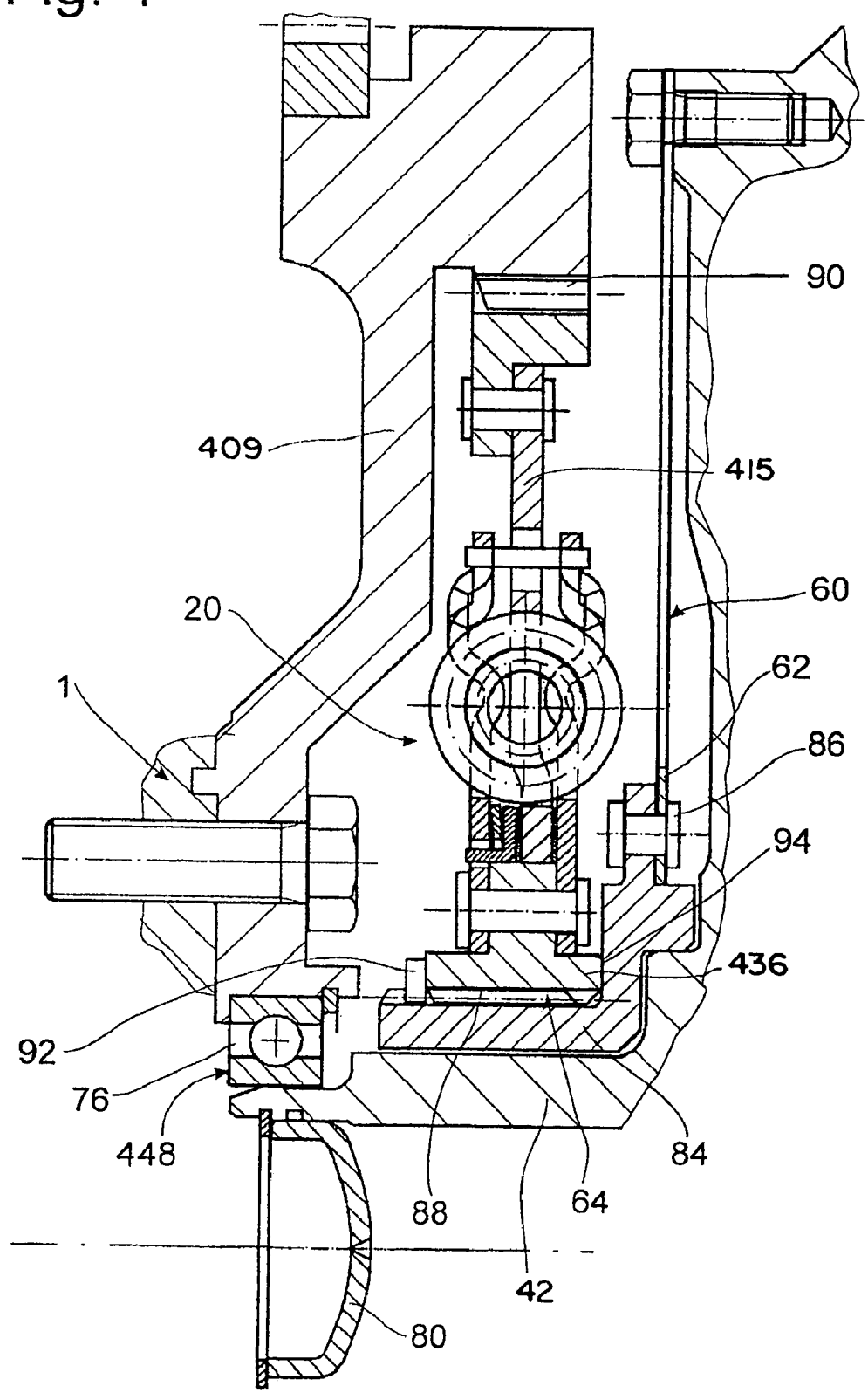
FIG. 4 is a cross sectional view of yet another embodiment of the clutch system.

FIG. 4 finally shows a design in which the bearing arrangement 448 is realized by a roller bearing 76 located radially between the flywheel mass element 409 and the bearing journal 42 of the housing 5, which has been extended axially versus the designs shown in FIGS. 1 and 3 and which is also closed off by a cover 80. At the same time, this bearing journal 42 also serves as a mount for a flexplate hub 84, also referred to as a drive plate hub, which is permanently attached to the drive side 62 of the flexplate 60 by rivets 86. The flexplate hub 84 is connected for rotation in common with the takeoff hub 436 of the torsional vibration damper 20 by way of a set of teeth 88, serving as a detachable connection 64. The flexplate hub 84 is centered with respect to the housing 5 in that the flexplate hub 84 is centered on the bearing journal 42 of the housing 5. The drive-side damping element 415 of the torsional vibration damper 20 is in turn connected nonrotatably to the flywheel mass element 409 by means of another set of teeth 90. Relative axial movement between the torsional vibration damper 20 and the flexplate hub 84 is prevented by a first axial stop 92 embedded in the flexplate hub 84 and by a second axial stop 94 provided as an integral part of the flexplate hub 84.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper acting between a drive and a housing of a hydrodynamic clutch arrangement, comprising:
    a flywheel mass element fastenable nonrotatably to the drive;
    a drive-side damping element having a first and a second side, the first side being connected nonrotatably to the flywheel mass element;
    a takeoff-side damping element, the second side of the drive-side damping element being connected by elastic elements to the takeoff-side damping element for rotation in common, the elastic elements also allowing a limited rotation of the drive-side damping element relative to the takeoff-side damping element;
    an axially flexible drive plate, the takeoff-side damping element being connectable to the housing of the hydrodynamic clutch arrangement nonrotatably but with a freedom of axial movement by means of the axially flexible drive plate, wherein the takeoff-side damping element is fastened to the axially flexible drive plate by a detachable connection; and
    a takeoff hub, a drive plate hub connected to a drive side of the axially flexible drive plate, and a set of teeth provided between the takeoff hub and the drive plate hub and forming the detachable connection.

2. The torsional vibration damper of claim 1, wherein the drive plate hub is centered with respect to the housing of the clutch arrangement.

3. The torsional vibration damper of claim 2, wherein said drive plate hub is configured to be centered on a bearing journal formed on a housing cover of the housing.

4. The torsional vibration damper of claim 1, wherein the axially flexible drive plate comprises a takeoff side configured for acting on the housing of the hydrodynamic clutch arrangement.

5. The torsional vibration damper of claim 1, wherein the axially flexible drive plate includes a plurality of spring rings arranged parallel to each other.

6. The torsional vibration damper of claim 1, further comprising fastening elements to attach the drive-side damping element to the flywheel mass element, wherein the drive-side damping element has, at predetermined circumferential intervals, holding sections for receiving the fastening elements and has sections bent over in an axial direction in circumferential gaps between the fastening elements providing a stiffening function.

7. A torsional vibration damper acting between a drive and a housing of a hydrodynamic clutch arrangement, comprising:
    a flywheel mass element fastenable nonrotatably to the drive;
    a drive-side damping element having a first and a second side, the first side being connected nonrotatably to the flywheel mass element;
    a takeoff-side damping element, the second side of the drive-side damping element being connected by elastic elements to the takeoff-side damping element for rotation in common, the elastic elements also allowing a limited rotation of the drive-side damping element relative to the takeoff-side damping element;
    an axially flexible drive plate, the takeoff-side damping element being connectable to the housing of the hydrodynamic clutch arrangement nonrotatably but with a freedom of axial movement by means of the axially flexible drive plate;
    a takeoff hub and a bearing arrangement, the takeoff hub being centered on the flywheel mass element and axially positioned by the bearing arrangement; and
    a support ring, wherein the bearing arrangement has a radial journal bearing element, the support ring being centered on the flywheel mass element by the radial journal bearing element.

8. The torsional vibration damper according to claim 7, further comprising a takeoff hub connected non rotatably to a drive side of the axially flexible drive plate, the takeoff-side damping element comprising at least one cover plate for actuating the elastic elements, the at least one cover plate being connected nonrotatably to the takeoff hub.

9. A torsional vibration damper acting between a drive and a housing of a hydrodynamic clutch arrangement, comprising:
    a flywheel mass element fastenable nonrotatably to the drive;
    a drive-side damping element having a first and a second side, the first side being connected nonrotatably to the flywheel mass element;
    a takeoff-side damping element, the second side of the drive-side damping element being connected by elastic elements to the takeoff-side damping element for rotation in common, the elastic elements also allowing a limited rotation of the drive-side damping element relative to the takeoff-side damping element;

an axially flexible drive plate, the takeoff-side damping element being connectable to the housing of the hydrodynamic clutch arrangement nonrotatably but with a freedom of axial movement by means of the axially flexible drive plate;

a takeoff hub and a bearing arrangement, the takeoff hub being centered on the flywheel mass element and axially positioned by the bearing arrangement; and a support ring, wherein the bearing arrangement has an axial journal bearing element, the support ring is held axially on the flywheel mass element by the axial journal bearing element.

10. A torsional vibration damper acting between a drive and a housing of a hydrodynamic clutch arrangement, comprising:

a flywheel mass element fastenable nonrotatably to the drive;

a drive-side damping element having a first and a second side, the first side being connected nonrotatably to the flywheel mass element;

a takeoff-side damping element, the second side of the drive-side damping element being connected by elastic elements to the takeoff-side damping element for rotation in common, the elastic elements also allowing a limited rotation of the drive-side damping element relative to the takeoff-side damping element;

an axially flexible drive plate, the takeoff-side damping element being connectable to the housing of the hydrodynamic clutch arrangement nonrotatably but with a freedom of axial movement by means of the axially flexible drive plate;

a takeoff hub and a bearing arrangement, the takeoff hub being centered on the flywheel mass element and axially positioned by the bearing arrangement, wherein the bearing arrangement is a roller bearing.

11. The torsional vibration damper of claim 10, wherein the bearing arrangement is mounted in a recess in the flywheel mass element on a side facing the axially flexible drive plate.

12. A hydrodynamic clutch system comprising:

a flywheel mass element configured nonrotatable connection to a drive;

a drive-side damping element having a first and a second side, the first side being connected nonrotatably to the flywheel mass element;

a takeoff-side damping element, the second side of the drive-side damping element being connected by elastic elements to the takeoff-side damping element for rotation in common, the elastic elements also allowing a limited rotation of the drive-side damping element relative to the takeoff-side damping element;

a clutch arrangement with a housing; and an axially flexible drive plate, the takeoff-side damping element being connected to the housing of the clutch arrangement nonrotatably but with a certain freedom of axial movement by the axially flexible drive plate, wherein the axially flexible drive plate includes a plurality of spring rings arranged parallel to each other.

* * * * *